(12) United States Patent
Khatchikian

(10) Patent No.: US 10,099,410 B2
(45) Date of Patent: Oct. 16, 2018

(54) METHOD OF MAKING A PANEL

(71) Applicant: KACHIGIAN LP, Glendale, CA (US)

(72) Inventor: Khatchik Chris Khatchikian, Burbank, CA (US)

(73) Assignee: KACHIGIAN LP, Glendale, CA (US)

( * ) Notice: Subject to any disclaimer, the term of this patent is extended or adjusted under 35 U.S.C. 154(b) by 426 days.

(21) Appl. No.: 14/429,734

(22) PCT Filed: Sep. 25, 2012

(86) PCT No.: PCT/US2012/057139
§ 371 (c)(1),
(2) Date: Mar. 19, 2015

(87) PCT Pub. No.: WO2014/051554
PCT Pub. Date: Apr. 3, 2014

(65) Prior Publication Data
US 2015/0224687 A1 Aug. 13, 2015
US 2016/0016340 A2 Jan. 21, 2016

(51) Int. Cl.
*B29C 44/32* (2006.01)
*B32B 5/20* (2006.01)
(Continued)

(52) U.S. Cl.
CPC .......... *B29C 44/24* (2013.01); *B29C 44/0461* (2013.01); *B29C 44/22* (2013.01);
(Continued)

(58) Field of Classification Search
CPC .......... B21F 1/04; B21F 27/20; B29C 44/206; B29C 44/22; B29C 44/26; B29C 44/32;
(Continued)

(56) References Cited

U.S. PATENT DOCUMENTS 2,792,852 A 5/1957 Talbot et al.
3,545,042 A 12/1970 Brozenick et al.
(Continued)

FOREIGN PATENT DOCUMENTS

EP 1347111 A1 * 9/2003
GB 1546153 A * 5/1979
(Continued)

OTHER PUBLICATIONS

Extended European Search Report dated May 9, 2016, for corresponding European Patent Application No. 12885750.5 (8 pages).
(Continued)

*Primary Examiner* — Michael A Tolin
(74) *Attorney, Agent, or Firm* — Lewis Roca Rothgerber Christie LLP

(57) ABSTRACT

A method is provided for manufacturing a seamless, reinforced panel of any desired length using a single mold. The seamless panels of the present invention may be used in a variety of construction application. In one embodiment, the method includes inserting at least a portion of a plurality of lattice trusses into a mold having an axial length, inserting a first filler material into the mold, the first filler material encapsulating at least a portion of the plurality of lattice trusses to form a panel segment, translating the panel segment a linear distance, the linear distance less than the axial length of the mold such that a portion of the panel segment remains in the mold, and inserting a second filler material into the mold, the second filler material intermixing with the portion of the panel segment remaining in the mold to form a seamless panel.

29 Claims, 7 Drawing Sheets

(51) Int. Cl.
  *E04C 2/22* (2006.01)
  *B29C 44/24* (2006.01)
  *B29C 44/44* (2006.01)
  *E04C 2/20* (2006.01)
  *B29C 70/68* (2006.01)
  *B29C 44/04* (2006.01)
  *B29C 44/22* (2006.01)
  *B29C 70/88* (2006.01)
  *B29D 99/00* (2010.01)
  *B29C 44/34* (2006.01)
  *B29K 25/00* (2006.01)
  *B29L 9/00* (2006.01)

(52) U.S. Cl.
  CPC .......... *B29C 44/322* (2013.01); *B29C 44/445* (2013.01); *B29C 70/688* (2013.01); *B29C 70/88* (2013.01); *B29D 99/001* (2013.01); *B32B 5/20* (2013.01); *E04C 2/205* (2013.01); *B29C 44/3461* (2013.01); *B29K 2025/06* (2013.01); *B29L 2009/00* (2013.01); *E04C 2/22* (2013.01)

(58) Field of Classification Search
  CPC ... B29C 44/322; B29C 44/326; B29C 44/329; B29C 44/332; B29C 44/334; B29C 44/3415; B29C 44/3426; B29C 44/3461; B29C 44/445; B29C 44/54; B29C 44/58; B29D 99/001; B29K 2025/06; B32B 5/20; E04C 2/205; E04C 2/22
  See application file for complete search history.

(56) References Cited

U.S. PATENT DOCUMENTS

| | | | |
|---|---|---|---|
| 3,555,131 A | | 1/1971 | Weismann |
| 3,838,241 A | * | 9/1974 | Weismann ............ B21F 27/128 140/112 |
| 4,291,732 A | | 9/1981 | Artzer |
| 4,340,802 A | | 7/1982 | Artzer |
| 4,614,013 A | | 9/1986 | Stevenson |
| 4,903,446 A | | 2/1990 | Richards et al. |
| 5,786,000 A | | 7/1998 | Berner |
| 6,045,350 A | | 4/2000 | Cretti |
| 6,226,942 B1 | | 5/2001 | Bonin |
| 6,412,243 B1 | | 7/2002 | Sutelan |
| 7,954,291 B2 | | 6/2011 | Cretti |
| 2005/0166542 A1 | * | 8/2005 | Stidman ............ B29C 44/1276 52/782.1 |
| 2008/0184663 A1 | | 8/2008 | Martirossyan et al. |
| 2010/0092597 A1 | * | 4/2010 | Candiracci ........ B29C 44/3426 425/4 C |
| 2011/0011032 A1 | | 1/2011 | Khatchikian |

FOREIGN PATENT DOCUMENTS

| | | |
|---|---|---|
| JP | 53-27225 | 3/1978 |
| JP | 6-143323 | 5/1994 |

OTHER PUBLICATIONS

Office Action, with English translation, for corresponding Chinese Patent Application No. 201280077276.9, dated May 26, 2016 (17 pages).
Office Action issued in Mexican Patent Application No. MX/a/2015/003741, dated Sep. 26, 2016, 6 pages.
Office action issued in Eurasian Patent Application No. 201590649/31, dated Nov. 24, 2016, 6 pages.
International Search Report for PCT/US2012/057139 dated Dec. 14, 2012, 2 pages.
Office Action issued in Chinese Patent Application No. 201280077276.9, dated Feb. 3, 2017, 18 pages.
English translation of Office action issued in Mexican patent application No. MX/a/2015/003741, dated Apr. 25, 2017, 3 pages.
Examination report issued in Australian patent application No. 2012391049, dated May 3, 2017, 3 pages.
English translation of Office action issued in corresponding Omani patent application No. OM/P/2015/00072, dated Nov. 2, 2017, 4 pages.
Office action issued in corresponding Philippines patent application No. 1-2015-500659, dated Jan. 5, 2018, 3 pages.
English translation of Office action issued in corresponding Eurasian patent application No. 201590649, dated Jul. 28, 2017, 3 pages.
English translation of Office action issued in corresponding Chinese patent application No. 201280077276.9, dated Aug. 31, 2017, 9 pages.
Office action issued in corresponding Mexican Patent Application No. MX/a/2015/003741, dated Feb. 20, 2018, 5 pages.
Office action issued in corresponding Korean Patent Application No. 10-2015-7009805 and English translation, dated Jul. 20, 2018, 10 pages.
Office action issued in corresponding Mexican Patent Application No. MX/a/2015/003741 and English translation, received Jul. 23, 2018, 4 pages.
Office action issued in corresponding Canadian Patent Application No. 2885985, dated Jul. 30, 2018, 6 pages.

* cited by examiner

METHOD OF MAKING A PANEL

CROSS-REFERENCE TO RELATED APPLICATION

This application is a National Phase Patent Application and claims the priority of International Application Number PCT/US2012/057139, filed on Sep. 25, 2012. The disclosure of which is hereby incorporated by reference.

FIELD OF THE INVENTION

The present invention relates generally to a method of making a panel, and more particularly to a method of making a seamless panel using a mold.

BACKGROUND OF THE INVENTION

Prefabricated modular panels are used in a variety of construction applications, such as constructing interior or exterior walls of a home. Conventional panels used in construction applications are fabricated as modular segments and then joined together in situ to form the desired length and configuration. Typically, the size of the individual panel segments is limited by the size of the mold used to fabricate the panel segments. Conventionally, longitudinal stringers or transverse braces may be used to interconnect adjacent panel segments to achieve the desired length or configuration of the assembled modular panel segments. Moreover, in some conventional methods, ends of the prefabricated panel segments must be prepared or treated before the adjacent wall segments can be interconnected. For instance, in some methods, a wire support structure of the ends of the panel segments must be exposed, and then the exposed ends of the panels are joined together, such as with wires. Additionally, the exposed ends of the panel segments may be covered with a bonding agent, such as concrete, to interconnect adjacent segments to form a unitary structure. Accordingly, such conventional methods of forming and interconnecting fixed length panel segments may be time consuming, costly, and complex. Moreover, using custom size molds to form different length panel segments may be prohibitively expensive because a manufacturer of modular panels may have to stock a variety of mold sizes in inventory in order to produce a variety of different length modular panels to meet customer demands.

As such, there is a need for a method of manufacturing a seamless panel in a continuous operation, which can then be cut to the desired length. Moreover, there is a need for a method of manufacturing a seamless panel without the need for intermediate joints between adjacent panel segments. There is also a need for a method of manufacturing a seamless panel of any desired length using a single mold.

SUMMARY OF THE INVENTION

The present invention is directed to a method of making a seamless panel using a mold. In one embodiment, the method of manufacturing a seamless panel comprises inserting a portion of a plurality of lattice trusses into a mold having an axial length, inserting a first filler material into the mold, the first filler material encapsulating the portion of the plurality of lattice trusses to form a panel segment, advancing the panel segment a linear distance, the linear distance less than the axial length of the mold such that a portion of the panel segment remains in the mold, and inserting a second filler material into the mold, the second filler material intermixing with the portion of the panel segment remaining in the mold to form a seamless panel. In one embodiment, intermixing comprises heating the mold to bond a portion of the second filler material to a portion of the first filler material remaining in the mold. In one embodiment, the first filler material and the second filler material are the same. In one embodiment, the difference between the linear distance the panel segment is advanced and the axial length of the mold is not less than approximately 1 meter. In another embodiment, the difference between the linear distance the panel segment is advanced and the axial length of the mold is less than approximately 1 meter.

In one embodiment, the method includes heating the mold to expand the filler material. In yet another embodiment, the method includes forming the plurality of lattice trusses, comprising feeding a plurality of wires into a welder, shaping at least one of the plurality of wires, and welding the plurality of wires. In another embodiment, the method includes sliding the welder in a first direction to feed the plurality of wires into the welder to form a plurality of lattice trusses, and sliding the welder in a second direction opposite the first direction to feed the plurality of lattice trusses into the mold.

In yet a further embodiment, the method comprises providing a mold having an upper half and a lower half opposite the upper half, wherein the upper and lower mold halves are configured to move between an open position for receiving the plurality of lattice trusses and a closed position having a cavity for receiving the filler material. In one embodiment, the method includes providing a mold having first and second openings on opposite ends of the mold, the first and second openings axially aligned, the first opening configured to receive the lattice trusses and the second opening configured to eject the advancing panel segments. In a further embodiment, the method includes inserting an upper portion of the plurality of lattice trusses in a plurality of upper channels in the upper mold half, and inserting a lower portion of the plurality of lattice trusses in a plurality of lower channels in the lower mold half, wherein the upper and lower channels are aligned, and wherein the upper and lower channels extend longitudinally along the axial length of the mold.

BRIEF DESCRIPTION OF THE DRAWINGS

Embodiments of methods of fabricating a seamless panel with any desired length using a single mold are described with reference to the following figures. The same reference numbers are used throughout the figures to reference like features, components, and method steps.

DETAILED DESCRIPTION

The present invention is directed to a method of manufacturing a seamless panel of any desired length using a mold. As described in detail below, the length of the seamless panel is not limited by the size of the mold. Instead, the seamless panel may be manufactured as a single continuous structure having any desired length without the need for connectors or brackets adjoining adjacent modular panel segments. Additionally, the seamless panel may be cut into varying length segments following production of the seamless panel. In general, the seamless panel may be used in a variety of construction applications, including for use as interior and exterior walls in a house.

Figure 1:
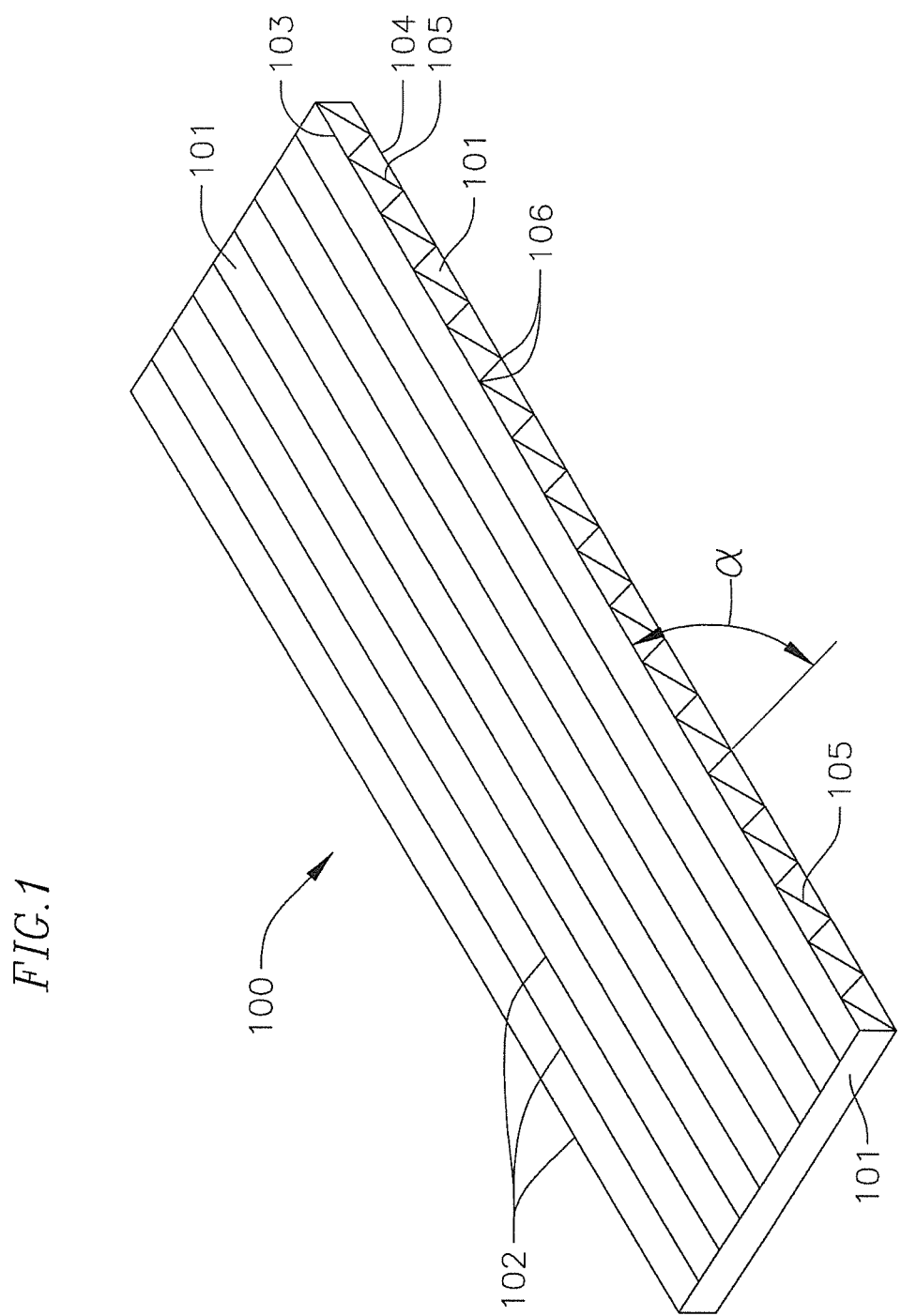
FIG. 1 is a perspective view of an embodiment of a seamless panel according to the methods of forming a seamless panel with a mold of the present invention.

Referring now to the embodiment illustrated in FIG. 1, the seamless panel 100 manufactured according to the methods described herein comprises a reinforcing framework at least partially encapsulated within a filler material 101. In one embodiment, the filler material 101 comprises expandable polystyrene (EPS). The framework is configured to provide structural rigidity and increased load-bearing capacity to the seamless panel 100. The framework comprises a plurality of lattice trusses 102 oriented longitudinally along the seamless panel 100 and laterally spaced apart. The plurality of lattice trusses 102 are bound together by the filler material 101. As described below, the filler material 101 is configured to expand in the mold to fill the gaps between the lattice trusses 102. In one embodiment, the lattice trusses 102 are couple together only by the filler material 101. Although the transverse gaps between adjacent lattice trusses 102 are uniform across the seamless panel 100 in the embodiment illustrated in FIG. 1, the lattice trusses 102 may be non-uniformly spaced and still fall within the scope and spirit of the present invention. In one embodiment, the seamless panel 100 may be approximately 3.66 feet (1.14 meters) wide and between approximately 2.5 inches (63.5 mm) and approximately 8 inches (203 mm) thick. It will be appreciated however, that the seamless panel 100 of the present invention may be produced with any desired thickness and width depending upon the application of the panel 100.

With continued reference to FIG. 1, each lattice truss 102 is comprised of parallel upper and lower longitudinal segments 103, 104, respectively, joined by a transverse segment 105. In the illustrated embodiment, the longitudinal segments 103, 104 are generally straight and the transverse segments 105 are generally sawtooth-shaped. The sawtooth-shaped transverse segments 105 extend between the longitudinal segments 103, 104 at an oblique angle α. In the illustrated embodiment, the transverse segments 105 are joined at their vertices 106 to the longitudinal segments 103, 104. As described below, the transverse members 105 may be joined to the longitudinal members 103, 104 by any suitable means, such as welding, to form the lattices trusses 102.

Figure 2A:
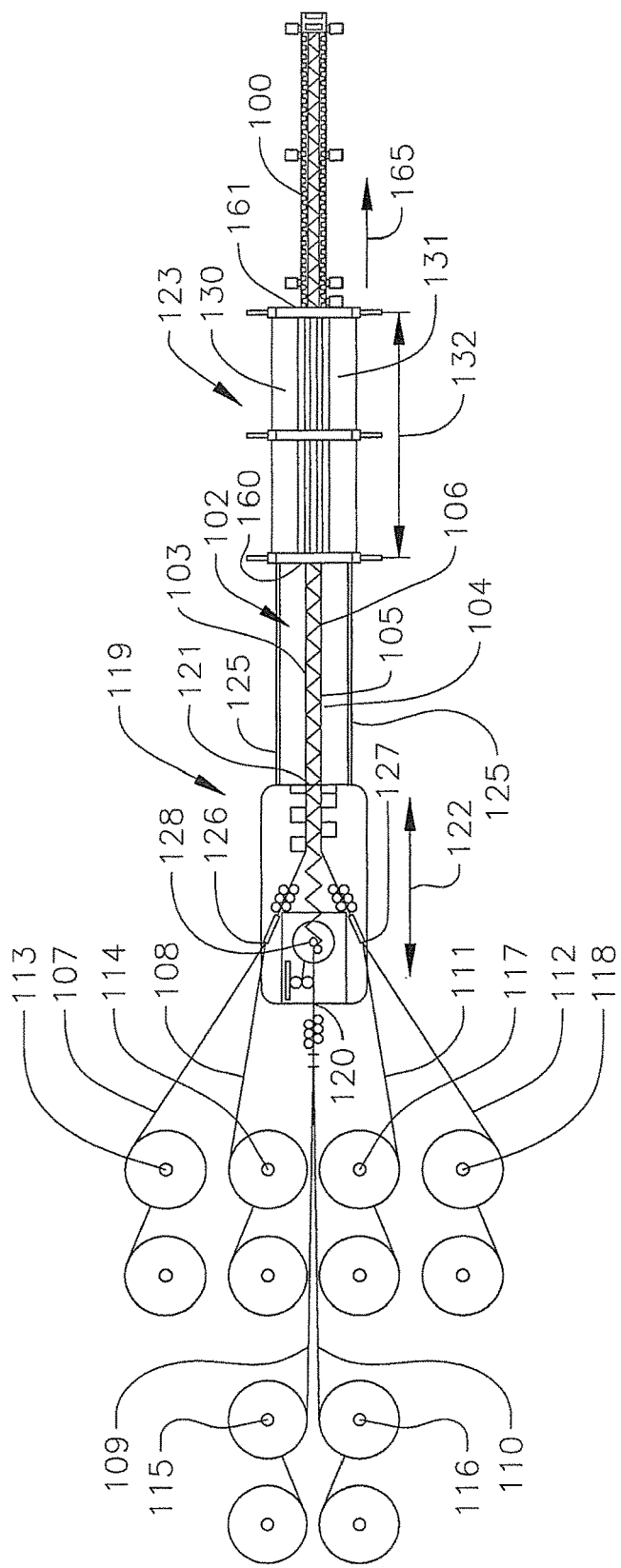
FIGS. 2A and 2B are schematic illustrations of the manufacturing equipment used to produce a seamless panel according to an embodiment of the present invention.
Figure 2B:
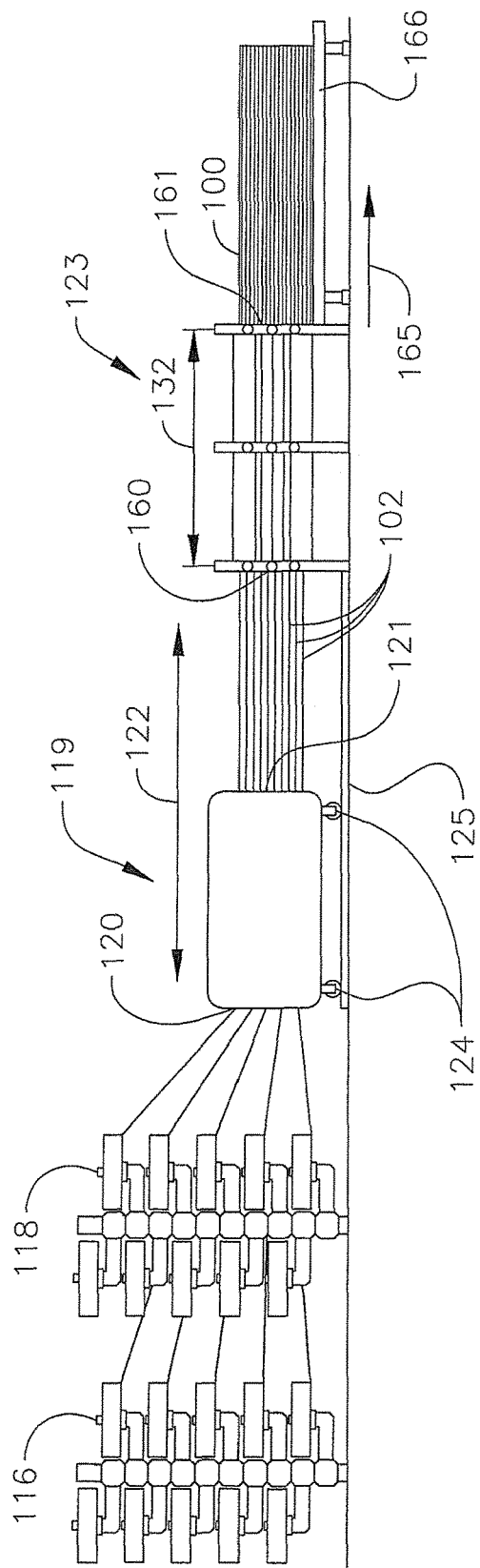
Figure 3A:
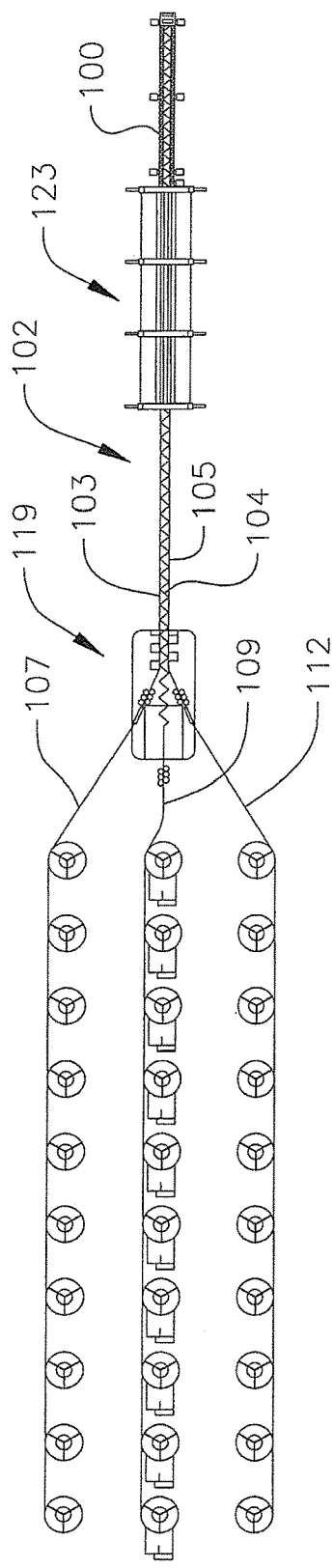
FIGS. 3A and 3B are schematic illustrations of the manufacturing equipment used to produce a seamless panel according to an embodiment of the present invention.
Figure 3B:
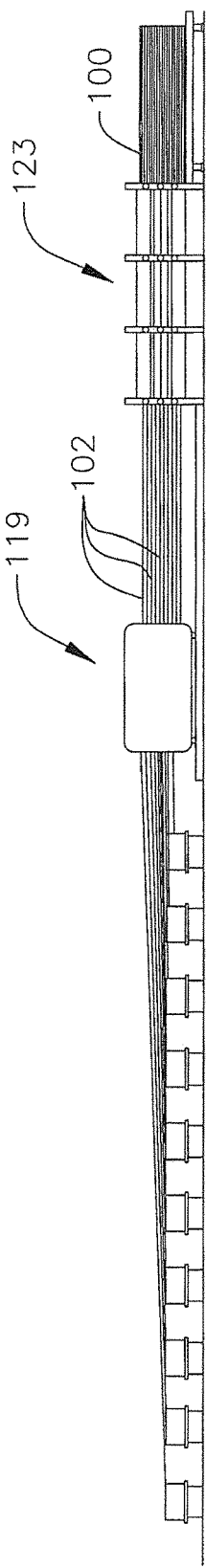

FIGS. 2A and 2B schematically illustrate the manufacturing equipment used to fabricate the seamless panel 100 according to one embodiment of the present invention. As illustrated in FIG. 2A, a plurality of wires 107, 108, 109, 110, 111, and 112 wound around individual spools 113, 114, 115, 116, 117, and 118, respectively, are fed into a reciprocating welder 119 to form the lattice trusses 102. In one embodiment, the wires may have a diameter of approximately 5 mm (0.20 inch), although the diameter of the wires may have any suitable diameter depending upon the desired strength of the panel 100. The reciprocating welder 119 includes an entry portion 120 proximate to the wire spools and an exit portion 121 distal to the wire spools. The individual wires are fed into the entry portion 120 of the reciprocating welder 119 and the lattice trusses 102 emerge from the exit portion 121 of the reciprocating welder 119. In one embodiment, each lattice truss 102 is formed from three separate wire feeds. In the illustrated embodiment of FIG. 2A, a first lattice truss 102 is formed by three wires 107, 109, and 112 and a second lattice truss 102 is formed by three wires 108, 110, and 111. Wire 107 forms the upper longitudinal member 103, wire 112 forms the lower longitudinal member 104, and wire 109 forms the transverse interconnecting member 105 of the first lattice truss 102. Similarly, wire 108 forms the upper longitudinal member 103, wire 111 forms the lower longitudinal member 104, and wire 110 forms the transverse interconnecting member 105 of the second lattice truss 102. As illustrated in FIGS. 2A and 2B, each wire may be fed from a pair of spools. Although the embodiment illustrated in FIGS. 2A and 2B is shown with ten lattice trusses 102 and thirty corresponding wire spools, the present invention is not so limited, and any number of lattice trusses 102 and corresponding wire spools may be used to form a seamless panel 100 having a desired length, strength, and durability. In one embodiment, the seamless panel 100 may include between approximately 4 and approximately 12 lattice trusses 102. Additionally, the wire spools may be arranged in any suitable alternate configuration. As illustrated in the alternate embodiment of FIGS. 3A and 3B, the wire spools may be arranged in a horizontal configuration along the ground rather than the stacked configuration illustrated in FIG. 2B.

With continued reference to the embodiment illustrated in FIGS. 2A and 2B, the welder 119 is configured to slide (arrow 122) in a reciprocating motion between the wire spools and the mold 123. The reciprocating welder 119 is configured to both form the plurality of lattice trusses 102 and insert the plurality of lattice trusses 102 into the mold 123. In one embodiment, the lower end of the welder 119 may include a plurality of rollers 124 configured to roll along the ground. In a further embodiment, the welder 119 may be slidably disposed along rails 125. The welder 119 may include any suitable means for reciprocating (arrow 122) the welder 119 between the wire spools and the mold 123, such as hydraulic actuators, a pneumatic system, or an electric motor coupled to a rack and pinion system.

As the reciprocating welder 119 slides rearward (arrow 122) toward the wire spools, the welder 119 unfurls the wires from the spools and feeds the wires through the welder 119 to form the lattice trusses 102. In the embodiment illustrated in FIGS. 2A and 2B, the wires may be fed through separate openings in the reciprocating welder 119 to align the wires in the desired configuration. The openings in the welder 119 may be configured to set the spacing between the upper and lower longitudinal members 103, 104, respectively, and may be configured to set the bend angle α of the transverse members 105 extending between the longitudinal members 103, 104. In the illustrated embodiment, the wires forming the longitudinal members 103, 104 of the lattice trusses 102 are obliquely fed through openings 126, 127 on opposite sides of the welder 119. The welder 119 then deflects the wires forming the upper and lower longitudinal members 103, 104 such that the upper and lower longitudinal members 103, 104 are parallel. Additionally, as illustrated in FIGS. 2A and 2B, the wires forming the transverse members 105, which join opposing longitudinal members 103, 104, follow a serpentine path around a plurality of rollers 128 in the welder 119. Accordingly, as the welder 119 slides rearward, the wires are fed through the serpentine rollers 128, which thereby forms the sawtooth-shaped transverse members 105. Moreover, the wires forming the transverse members 105 of the lattice trusses 102 are fed through the welder 119 at a higher rate of speed than the wires forming the upper and lower longitudinal members 103, 104 of the lattice trusses 102 to accommodate the greater length of the sawtooth-shaped transverse member 105 (i.e., the differential feed rate compensates for the greater length of wire required to form the transverse members 105 compared to the longitudinal members 103, 104 of the lattice trusses 102). After the welder 119 has formed and aligned the wires, the welder 119 interconnects the transverse members 105 to the longitudinal members 103, 104 by any suitable welding method, such as spot welding or tack welding. Accordingly, during the rearward movement (arrow 122) of the welder 119, the reciprocating welder 119 both bends the transverse interconnected members 105 into the sawtooth shape and welds the vertices 106 of the transverse members 105 to the upper and lower longitudinal members 103, 104. In an alternate embodiment, one or more separate mechanisms may be provided to unwind the wires from the spools and feed the wires through the welder 119. In a further embodiment, the welder 119 may form the transverse members 105 by any other suitable means, such as stamping. In another embodiment, the lattice trusses 102 may be pre-fabricated.

In the top view of the embodiment illustrated in FIG. 2A, each lattice truss 102 exits the reciprocating welder 119 in a horizontal orientation such that the longitudinal members 103, 104 are in the same horizontal plane. Moreover, in the side view of the embodiment illustrated in FIG. 2B, the ten lattice trusses 102 exit the reciprocating welder 119 in a vertically stacked configuration. In an alternate embodiment, each of the lattice trusses 102 may exit the welder 119 in a vertical orientation with the upper longitudinal members 103 directly above the corresponding lower longitudinal members 104. In one embodiment, the lattice trusses 102 may exit the reciprocating welder 119 in a side-by-side horizontal configuration.

After the reciprocating welder 119 has moved rearward (arrow 122) to form the plurality of lattice truss segments 102, the reciprocating welder 119 clamps on to the lattice truss segments 102 before moving forward toward the mold 123, described in detail below. As illustrated in FIGS. 2A and 2B, as the reciprocating welder 119 moves forward (arrow 122) toward the mold 123, the welder 119 feeds the completed lattice truss segments 102 into the mold 123 and simultaneously advances a completed panel segment 100 out of the mold 123.

Figure 4:
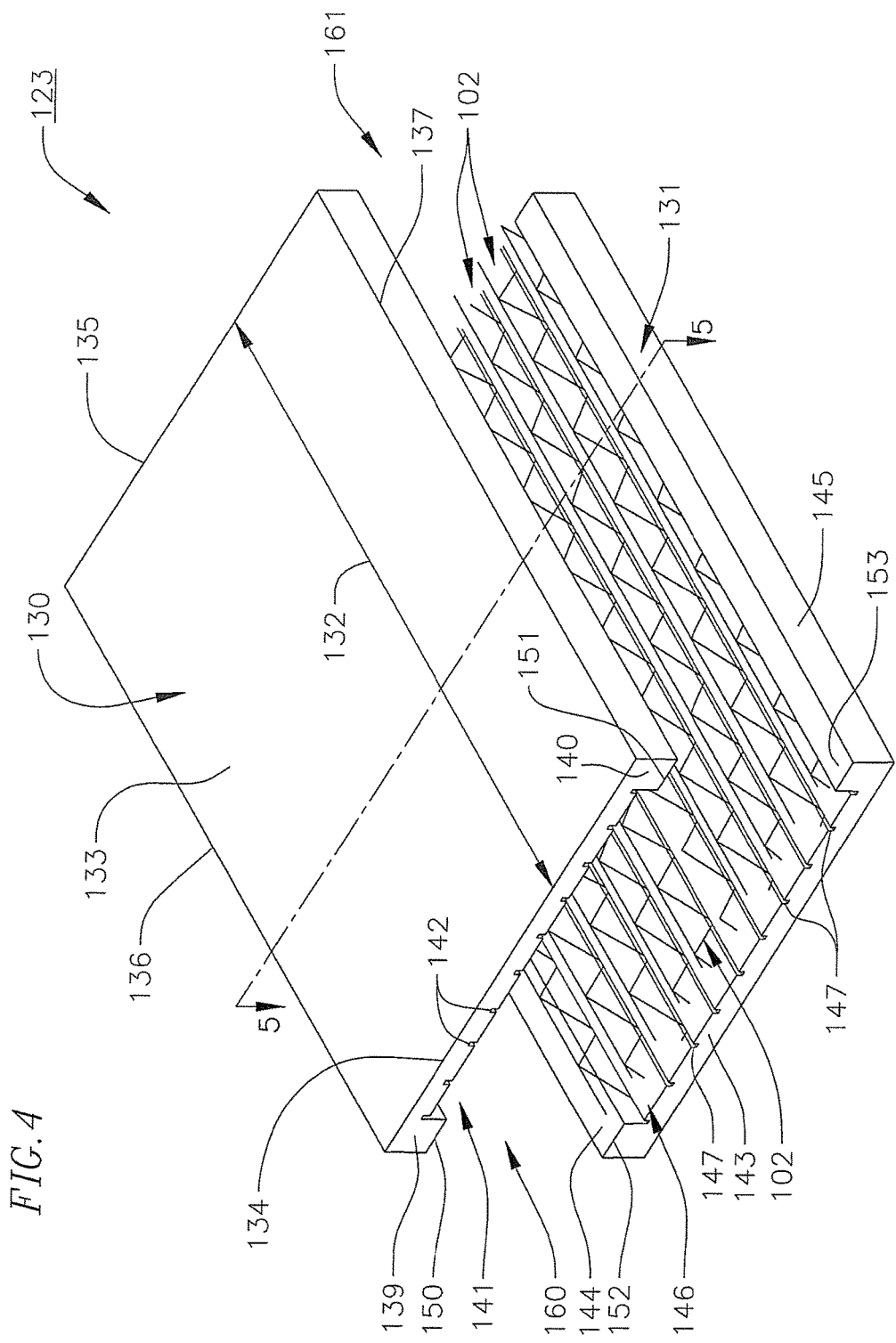
FIG. 4 is a perspective view of a plurality of truss segments inserted into a mold during manufacturing of a seamless panel according to one embodiment of the present invention.
Figure 5:
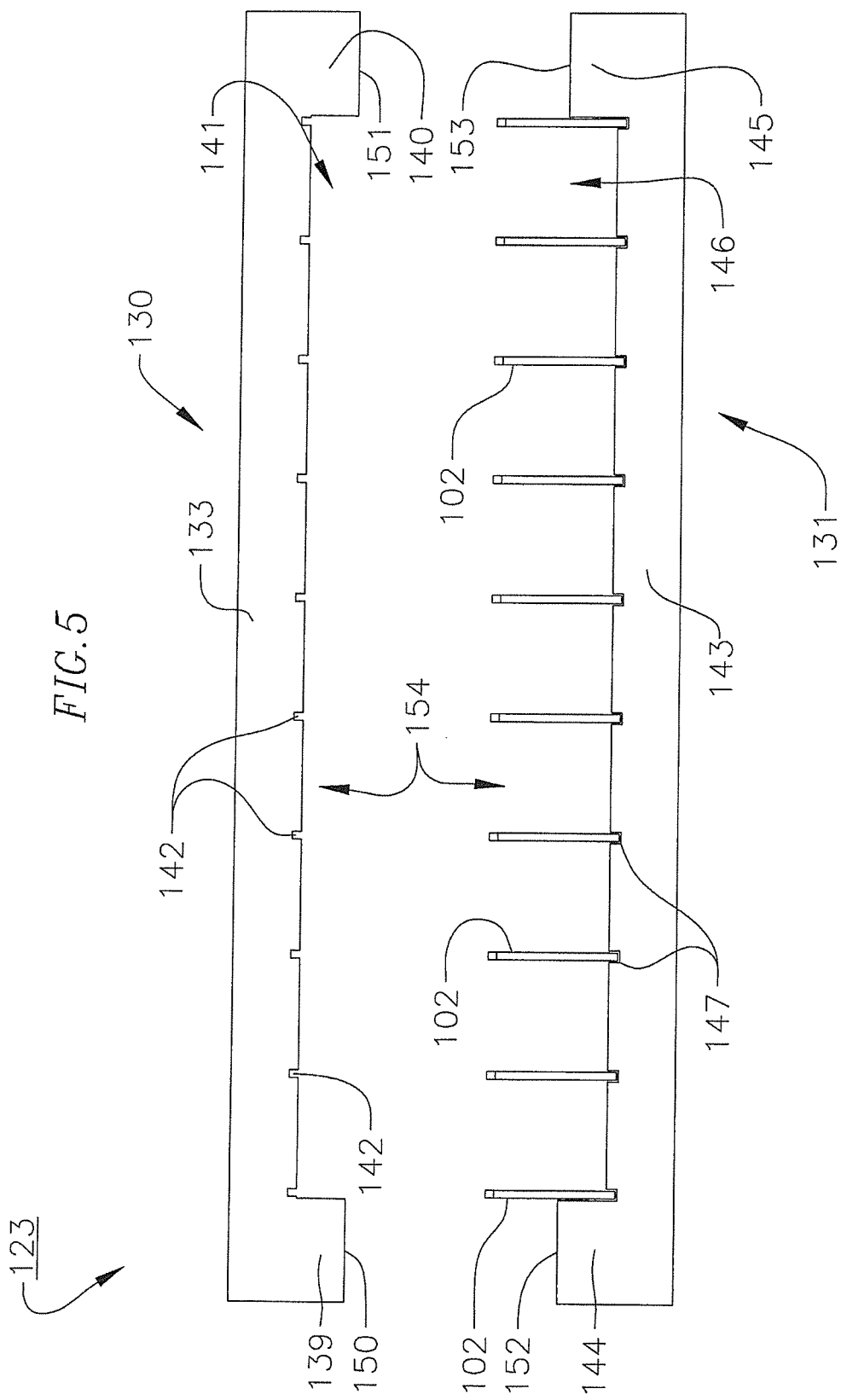
FIG. 5 is a cross-sectional view of the embodiment of the mold and truss segments illustrated in FIG. 4.

With reference now to the embodiment illustrated in FIGS. 4 and 5, the mold 123 comprises opposing upper and lower portions 130, 131 having an axial length 132. The upper portion 130 comprises a generally rectangular base 133 having opposing ends 134, 135, and opposing sides 136, 137. The upper portion 130 of the mold 123 also includes sidewall portions 139, 140 extending downward from the rectangular base 133. The sidewall portions 139, 140 extend longitudinally along the entire axial length 132 of the mold 123. Together, the base 133 and the sidewalls 139, 140 of the upper portion 130 of the mold 123 form an inverted U-shaped recess 141 configured to receive a portion of the lattice trusses 102. Additionally, the base 133 includes a plurality of channels or grooves 142 extending longitudinally along the entire axial length 132 of the upper mold 130. Similarly, the lower portion 131 of the mold 123 comprises a generally rectangular base 143 having two sidewalls 144, 145 extending upward from opposite sides of the base 143. Together, the two sidewalls 144, 145 and the base 143 form a U-shaped recess 146. The base 143 of the lower portion 131 also includes a plurality of channels 147 extending longitudinally along the entire axial length 132 of the lower portion 131. The channels 147 in the lower portion 131 are configured to align with the channels 142 in the upper portion 130 of the mold 123. In one embodiment, the channels are only located in either the lower portion 131 or the upper portion 130.

As illustrated in FIGS. 4 and 5, the channels 142, 147 are configured to receive and support the lattice trusses 102. The number of channels 142, 147 in each portion 130, 131 corresponds to the maximum number of lattice trusses 102 in the seamless panel 100. When the mold 123 is in the closed position, lower surfaces 150, 151 of the sidewalls 139, 140 of the upper portion 130 abut upper surfaces 152, 153 of the sidewalls 144, 145 of the lower portion 131 of the mold 123. Moreover, the recesses 141, 146 in the upper and lower portions 130, 131, respectively, form an interior cavity 154, when the mold 123 is in the closed position. In one embodiment, the mold 123 is approximately 12 feet (3.7 meters) in length and 4 feet (1.2 meter) in width, although the mold 123 may have any other suitable dimensions and still fall within the scope and spirit of the present invention.

With continuous reference to FIGS. 4 and 5, opposite ends of the mold 119 include openings 160, 161 (best shown in FIGS. 2A and 2B) such that a continuous, seamless length of panel 100 can be formed. The first opening 160 in the mold 123 is configured to receive the lattice trusses 102 and the second opening 161 in the mold is configured to simultaneously eject the advancing panel segments 100. That is, opposite ends of the mold 123 are open such that when a panel segment 100 is transported out of the mold 123, a portion of the plurality of lattice trusses 102 is simultaneously inserted into the mold 123 by the reciprocating welder 119. In this manner, a continuous length of lattice trusses 102 can be fed into the mold 123, producing a continuous, seamless length of panel 100 (i.e., a continuous length of lattice trusses 102 at least partially encapsulated in the filler material 101). Otherwise, individual or modular panel segments would have to be formed and then subsequently interconnected, such as by fasteners, stringers, or bonding agent. That is, if the ends of the mold 123 were enclosed, the lattice trusses 102 would have to be cut into modular units and then inserted into the interior cavity of the mold 123, producing modular panel segments rather than a continuous, seamless panel 100 of any desired length, as described herein.

With reference again to FIGS. 2A and 2B, the lattice trusses 102 are fed from the reciprocating welder 119 and into the channels 142, 147 in the upper and lower portions 130, 131, respectively, of the mold 123. Specifically, the upper longitudinal members 103 of the lattice trusses 102 are inserted into the channels 142 in the upper portion 130 of the mold 123 and the lower longitudinal members 104 of the lattice trusses 102 are inserted into the channels 147 in the lower portion 131 of the mold 123. The channels 142, 147 are configured to support the lattice trusses 102 in the desired configuration during the injection molding process, described below. In the illustrated embodiment, the upper and lower portions 130, 131 of the mold 123 are separable to receive the lattice trusses 102. In one embodiment, the reciprocating welder 119 may insert the lattice trusses 102 into the channels 142, 147 in either the upper or lower portion 130, 131 and then the upper and lower portions 130, 131 of the mold 123 may be closed together. As the upper and lower portions 130, 131 are closed together, the lattice trusses 102 extend into the channels 142, 147 in the other portion 130, 131. In one embodiment, the reciprocating welder 119 may insert the lattice trusses 102 into the mold 123 when the upper and lower portions 130, 131 are closed together. In another embodiment, the mold 123 may be a single piece.

With continued reference to FIGS. 2A and 2B, the filler material 101, such as EPS pellets, is then injected through ports or apertures in the mold 123 into the interior cavity 154 (see FIG. 5). A heat source may then be applied to the mold 123, which expands the EPS pellets and fuses them together. In one embodiment, the heat source comprises steam injected into the mold 123. The expanded EPS filler material 101 envelopes the lattice trusses 102 in the mold 123 and fills the interior cavity 154 of the mold 123. In one embodiment, the mold 123 is then cooled, which causes the EPS pellets to solidify. The mold 123 may be cooled by removing the heat source. In one embodiment, the mold 123 may be cooled by applying a cooling source, for instance applying water having a temperature of approximately 55° C. (131° F.). In this way, a panel segment 100 is formed having reinforcing lattice trusses 102 bonded together by the expanded EPS filler material 101. In one embodiment, a door (not shown) is provided to seal the opening 161 in the forward end of the mold 123 and thereby prevent the filler material 101 from inadvertently falling out of the opening 161 in the mold 123 during the injection molding operation (i.e., the door is configured to retain the filler material 101 in the mold 123 during the injection molding operations). The door (not shown) may be hingedly connected to the forward end of the mold 123 and movable between a closed position and an open position. Following the formation of the first panel segment 100, the door is opened to permit the panel segment 100 to be advanced out of the mold 123. As described in detail below, in one embodiment the door (not shown) may be used only during the production of the first panel segment 100. During production of subsequent panel segments 100, the previously formed panel segment 100 may provide the seal preventing the filler material 101 from inadvertently falling out of the opening 161 in the forward end of the mold 123.

In one embodiment, the filler material 100 is pre-treated prior to being injected into the mold 123 to achieve a desired density of the filler material 101 (i.e., the filler material 101 may be pre-treated to reduce the density of the filler material 101 prior to injection into the mold 123). In one embodiment, the filler material 101 is provided as EPS pellets or beads. The EPS beads may be pre-treated by placing the beads into a chamber containing any suitable expansion material, such as pentane. In one embodiment, heat is applied to the chamber in which the EPS beads are soaking. The application of heat expands and reduces the density of the EPS beads saturated with pentane. The expansion material prevents the EPS beads from fusing together during the application of the heat source. The expanded EPS beads are then transported to a drying mechanism, such as an air dryer, prior to being injected into the mold 123.

With continued reference to FIGS. 2A and 2B, after the filler material 101 has been injected into the mold 123, the upper and lower portions 130, 131 of the mold 123 may then be separated to expose the segment of panel 100 (i.e., a segment of lattices trusses 102 at least partially encapsulated and interconnected by the expanded filler material 101). The upper and lower portions 130, 131 of the mold 123 may be moved between the open and closed positions by any suitable means, such as hydraulic, pneumatic, or electric actuation or by manual operation. The newly formed panel segment 100 is then longitudinally advanced forward (arrow 165) by the reciprocating welder 119 until only a small end portion of the panel segment 100 remains between the upper and lower portions 130, 131 of the mold 123 (i.e., a small portion of the rear end of the previously formed panel segment 100 overlaps a portion of the opening 161 in the forward end of the mold 123 during each successive injection molding operation). That is, the panel segment 100 is longitudinally advanced a distance less than the axial length 132 of the mold 123 such that a portion of the rear end of the panel segment 100 extends into the second opening 161 in the mold 123 during each successive injection molding operation. In one embodiment, approximately 1 meter of the rear end of the previously formed panel segment 100 may remain in the mold 123 during each successive injection molding operation. In another embodiment, less than 1 meter, for instance 1 foot, of the rear end of the previously formed panel segment 100 may remain in the mold 123 during each successive injection molding operation. In another embodiment, not less than 1 meter of the rear end of the previously formed panel segment 100 may remain in the mold 123 during each successive injection molding operation. It will be appreciated, however, that any suitable length of panel segment 100 may remain in the mold 123 during successive injection molding operations. In one embodiment, rollers or a conveyor 166 (FIG. 2B) positioned near the second opening 161 of the mold 123 may work in conjunction with the reciprocating welder 119 to longitudinally advance (arrow 165) the panel segments 100 out of the mold 123.

As the panel segment 100 is longitudinally advanced (arrow 165) out of the mold 123, the reciprocating welder 119 continues to feed lattice trusses 102 into the channels 142, 147 in the upper and lower portions 130, 131 of the mold 123. In the illustrated embodiment, the rate at which the panel segment 100 is advanced out of the mold 123 is the same as the rate at which the welder 119 feeds lattice trusses 102 into the mold 123 because the welder 119 simultaneously feeds the lattice trusses 102 into the mold 123 and advances the panel segments 100 out of the mold 123. The mold 123 is then closed and the EPS filler material 101 is again injected into the interior cavity 154 of the mold 123 through ports in the mold 123. The mold 123 is then heated again, such as by injecting steam into the mold 123, which causes the newly added filler material 101 to expand, fuse together, encapsulate the portion of the lattice trusses 102 in the mold 123, and fill the interior cavity 154 of the mold 123, as described above. Additionally, as the mold 123 is heated, the portion of the filler material 101 that remained in the mold 123 melts and intermixes with the newly added filler material 101, creating a continuous, seamless panel 100. That is, the previously formed panel segment is fused together with the subsequently formed panel segment to form a continuous, seamless panel 100. This process may be repeated until a panel having a desired length is achieved. It will be appreciated that the portion of the previously formed panel segment 100 which remains in the mold 123 provides a seal which is configured to retain subsequent injections of filler material 101 in the mold 123. That is, the portion of the previously formed panel segment 100 which remains in the mold 123 prevents subsequent injections of filler material 101 from falling out of the opening 161 in the forward end of the mold 123. Moreover, it will be apparent to a person of ordinary skill in the art that the door (not shown) described above may be used only during the production of the first panel segment 100. After the first panel segment 100 has been formed and partially advanced out of the mold 123, the portion of the panel segment 100 which remains in the mold 123 provides the seal preventing the filler material 101 from falling out of the opening 161 in the mold 123 during subsequent injection molding operations.

Figure 6:
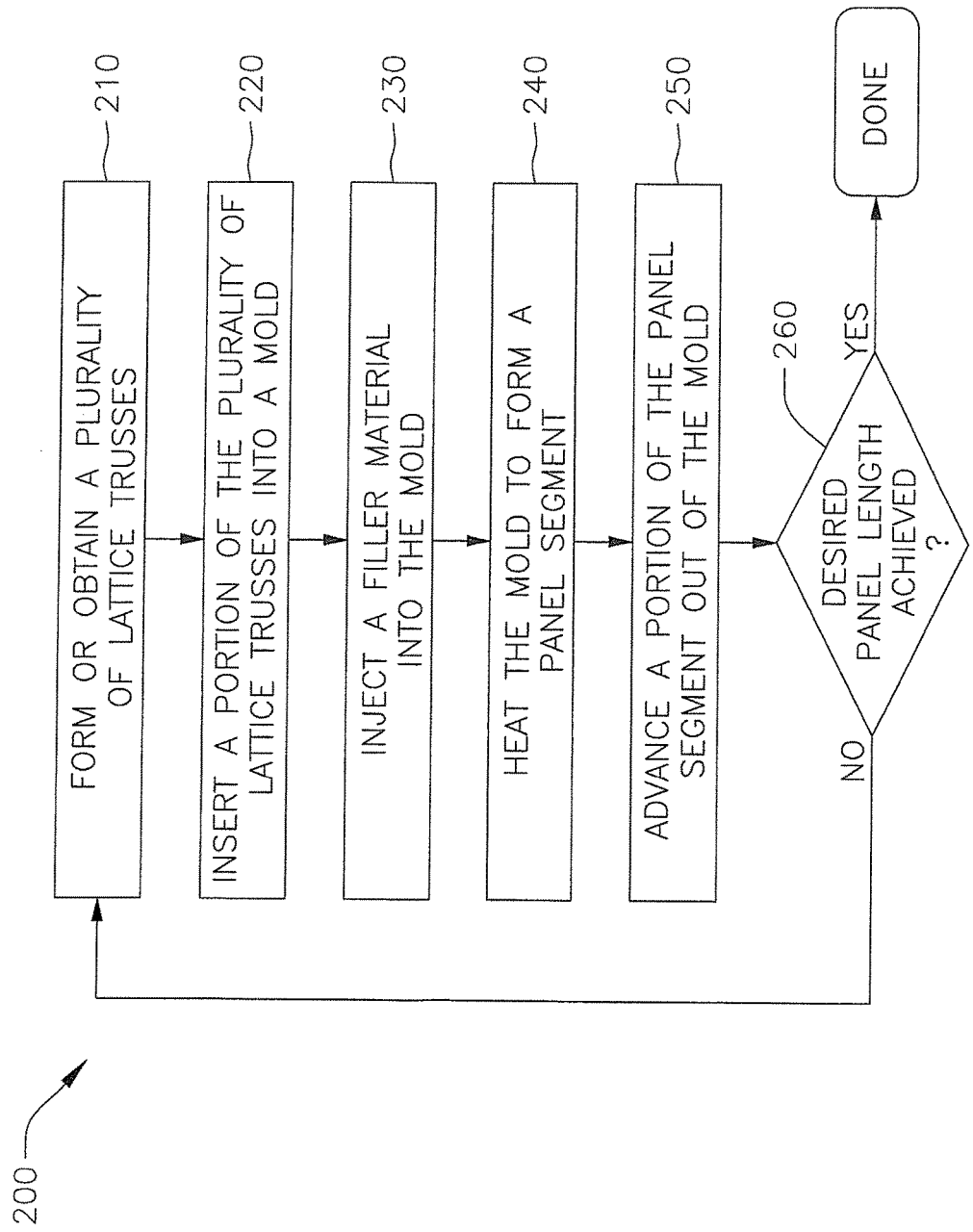
FIG. 6 is a flowchart illustrating an exemplary method of forming a seamless panel with a mold according to an embodiment of the present invention.

Referring now to FIG. 6, a method of manufacturing a seamless panel 200 includes forming or obtaining a plurality of lattice trusses 210 and inserting a portion of the plurality of lattice trusses into a mold 220. As described above, the plurality of lattice trusses may be formed by feeding a plurality of wires into a reciprocating welder, which forms the wires into the desired configuration, welds the wires together, such as by spot welding, and inserts the plurality of lattice trusses into the mold. Moreover, as described above, the mold may include a plurality of channels for receiving the plurality of lattice trusses. In one embodiment, the method includes injecting a filler material (e.g., expandable polystyrene) into the mold 230 housing a portion of the plurality of lattice trusses. In yet another embodiment, the method of manufacturing a panel 200 may include heating the mold 240, such as by injecting steam into a port in the mold, to expand the filler material and thereby form a panel segment. The method may also include advancing a portion of the panel segment out of the mold 250. As described above, an end portion of the panel segment, such as less than approximately 1 inch, remains in the mold during subsequent injection moldings. In one embodiment, the user then decides whether a desired panel length has been achieved 260. If not, the aforementioned steps are repeated until the desired panel length is achieved. During subsequent injections of filler material into the mold, the portion of the previously formed panel segment that remained in the mold intermixes with the newly added filler material, creating a continuous, seamless panel.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "vertical," "horizontal" and similar terms have been used herein to describe a spatial relationship of one element to another, it is understood that these terms are intended to encompass different orientations of the various elements and components of the device in addition to the orientation depicted in the figures. While in one embodiment, the method 200 of forming a seamless panel may include each of the tasks described above and shown in FIG. 6, in other embodiments one or more of the tasks may be absent and/or additional tasks may be performed. Moreover, the figures contained in this application are not necessarily drawn to scale.

What is claimed is:

1. A method of making a seamless panel, comprising:
    inserting a first section of each of a plurality of lattice trusses into a mold cavity while retaining a second section of each of the plurality of said lattice trusses outside of the mold cavity, said cavity having an axial length;
    inserting a first filler material into the mold cavity, the first filler material encapsulating at least a portion of the first section of each of the plurality of lattice trusses;
    heating the first filler material in the mold cavity to form a first panel segment;
    advancing the first panel segment a linear distance, the linear distance being less than the axial length of the mold cavity such that a section of the first panel segment remains in the mold cavity and another section of the first panel segment is outside of the mold cavity;
    advancing said second section of each of said plurality of lattice trusses in the mold cavity along a direction;
    inserting a second filler material into the mold cavity; and
    heating the second filler material and at least a portion of the section of the first panel segment remaining in the mold cavity such that the second filler material intermixes with the at least a portion of the section of the first panel segment remaining in the mold cavity to form a second panel segment intermixed with the first panel segment forming a seamless panel wherein said plurality of trusses extends continuously across the first and second panel segments, wherein the seamless panel portion formed from the filler materials has a thickness and wherein the plurality of trusses each has a height that is greater than the thickness, wherein the height is transverse to said direction.

2. The method of claim 1, wherein the first filler material and the second filler material are the same.

3. The method of claim 1, further comprising heating the second filler material in the mold cavity to expand the second filler material.

4. The method of claim 1, further comprising cooling the mold cavity.

5. The method of claim 1, further comprising forming the plurality of lattice trusses, wherein for each of the plurality of lattice trusses the method comprises:
    feeding a plurality of wires into a welder;
    shaping at least one of the plurality of wires in the welder; and
    welding the plurality of wires.

6. The method of claim 5, wherein each of the plurality of lattice trusses comprises three wires.

7. The method of claim 5, wherein each of the plurality of wires is supplied on individual spools.

8. The method of claim 5, further comprising:
    moving the welder in a first direction to feed the plurality of wires into the welder; and
    moving the welder in a second direction opposite the first direction to feed the plurality of lattice trusses into the mold cavity.

9. The method of claim 8, wherein moving the welder in the second direction further comprises simultaneously advancing said another section of the panel segment out of the mold cavity.

10. The method of claim 1, further comprising repeating the steps of claim 1 until a desired length of panel is achieved.

11. The method of claim 1, wherein the first and second filler materials comprise expandable polystyrene (EPS).

12. The method of claim 1, wherein the mold comprises a first portion and a second portion, wherein the mold cavity is defined between said mold first and second portions, and wherein the first and second portions are configured to move between an open position for receiving the plurality of lattice trusses and a closed position defining said mold cavity for receiving the first filler material.

13. The method of claim 1, wherein the mold comprises a first portion and second portion, and wherein the method further comprises separating the mold first and second portions to receive the lattice trusses.

14. The method of claim 1, wherein the mold comprises a first portion and second portion, and wherein the method further comprises closing the mold first and second portions to receive the second filler material.

15. The method of claim 1, wherein the mold comprises a first portion and second portion, and wherein the method further comprises separating the mold first and second portions to expose the panel segment.

16. The method of claim 1, wherein the panel segment comprises between 4 and 12 lattice trusses.

17. The method of claim 1, wherein the difference between the linear distance and the axial length of the mold is less than approximately 1 meter.

18. The method of claim 1, wherein the difference between the linear distance and the axial length of the mold is not less than approximately 1 meter.

19. The method of claim 1, wherein each of the plurality of lattice trusses comprises an upper longitudinal wire, a lower longitudinal wire parallel with the upper longitudinal wire, and a transverse wire extending between the upper and lower longitudinal wires.

20. The method of claim 1, further comprising pre-expanding the second filler material, said pre-expanding comprising:
saturating expandable polystyrene beads with pentane; and
heating the expandable polystyrene beads saturated with pentane.

21. The method of claim 20, further comprising drying the expandable polystyrene beads.

22. The method of claim 1, wherein the mold comprises a first portion and a second portion, wherein the mold cavity is defined between said mold first and second portions, the method further comprising:
inserting a first portion of each of the plurality of lattice trusses in a plurality of first channels in the first mold portion; and
inserting a second portion of each of the plurality of lattice trusses opposite the first portion in a plurality of second channels in the second mold portion, wherein the first and second channels are aligned and the plurality of lattice trusses extend therebetween, and wherein the first and second channels extend longitudinally along the axial length of the mold cavity.

23. The method of claim 1, further comprising first and second openings on opposite ends of the mold cavity, the first and second openings being axially aligned, wherein the first opening is configured to receive the plurality of lattice trusses and the second opening is configured to eject the advancing panel segments.

24. The method of claim 1 wherein each of the plurality of trusses extends externally along an entire length of said seamless panel.

25. The method as recited in claim 1 wherein each of the plurality of trusses extends externally from opposite sides of the seamless panel along an entire length of said seamless panel.

26. The method as recited in claim 1 further comprising forming said plurality of trusses with a welder and wherein inserting comprises inserting each of the plurality of trusses directly from the welder to the mold.

27. The method of claim 1 wherein the linear distance is any of a plurality of distances less than the axial length of the mold cavity.

28. A method of making a seamless panel, comprising:
feeding a plurality of wires into a welder;
shaping at least one of the plurality of wires in the welder;
welding the plurality of wires to form a plurality of lattice trusses;
moving the welder in a first direction to feed the plurality of wires into the welder;
moving the welder in a second direction opposite the first direction to feed at least a portion of the plurality of lattice trusses into the cavity of a mold, said cavity having an axial length;
inserting a first filler material into the mold cavity, the first filler material encapsulating at least a portion of the plurality of lattice trusses;
heating the first filler material in the mold cavity to form a panel segment;
advancing the panel segment a linear distance, the linear distance being less than the axial length of the mold cavity such that a section of the panel segment remains in the mold cavity and another section of the panel segment is outside of the mold cavity;
advancing another portion of said plurality of lattice trusses in the mold cavity;
inserting a second filler material into the mold cavity; and
heating the second filler material and at least a portion of the section of the panel segment remaining in the mold cavity such that the second filler material intermixes with the at least a portion of the section of the panel segment remaining in the mold cavity to form a seamless panel.

29. The method of claim 28, wherein moving the welder in the second direction further comprises simultaneously advancing said another section of the panel segment out of the mold cavity.

* * * * *